US011420625B2

(12) United States Patent
Perincherry et al.

(10) Patent No.: US 11,420,625 B2
(45) Date of Patent: Aug. 23, 2022

(54) VEHICLE INTERSECTION OPERATION

(71) Applicant: Ford Global Technologies, LLC, Dearborn, MI (US)

(72) Inventors: Akhil Perincherry, Dearborn, MI (US); Kunjan Singh, Ann Arbor, MI (US); Nikhil Nagraj Rao, Cupertino, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 360 days.

(21) Appl. No.: 16/503,104

(22) Filed: Jul. 3, 2019

(65) Prior Publication Data

US 2021/0001844 A1    Jan. 7, 2021

(51) Int. Cl.
*B60W 30/095* (2012.01)
*B60W 50/14* (2020.01)
(Continued)

(52) U.S. Cl.
CPC .... *B60W 30/0956* (2013.01); *B60W 50/0097* (2013.01); *B60W 50/14* (2013.01); *G05B 13/026* (2013.01); *G05B 13/0265* (2013.01); *G06T 7/97* (2017.01); *B60W 30/09* (2013.01); *B60W 2050/146* (2013.01); *B60W 2420/42* (2013.01); *B60W 2554/00* (2020.02); *B60W 2710/18* (2013.01); *G06T 2207/20081* (2013.01); *G06T 2207/30236* (2013.01); *G06T 2207/30242* (2013.01); *G06T 2207/30256* (2013.01)

(58) Field of Classification Search
CPC ......... B60W 30/0956; B60W 50/0097; B60W 50/14; B60W 2554/00; B60W 30/09; B60W 2050/146; B60W 2420/42; B60W 2710/18; G05B 13/026; G05B 13/0265; G06T 7/97; G06T 2207/20081; G06T 2207/30236; G06T 2207/30242; G06T 2207/30256
USPC .......................................................... 701/70
See application file for complete search history.

(56) References Cited

U.S. PATENT DOCUMENTS 9,534,910 B2    1/2017  Okumura
10,005,464 B2   6/2018  Toyoda et al.
(Continued)

FOREIGN PATENT DOCUMENTS

CN    202904881 U  *  4/2013
CN    105160896 B  *  5/2017
(Continued)

OTHER PUBLICATIONS

Shin-ichiro et al., "Moving Objects Detection at an Intersection by Sequential Background Extraction," 2011, Publisher: IEEE.*
(Continued)

*Primary Examiner* — Tuan C To
(74) *Attorney, Agent, or Firm* — Frank A. MacKenzie; Bejin Bieneman PLC

(57) ABSTRACT

A computer includes a processor and a memory, the memory storing instructions executable by the processor to collect a plurality of images of one or more targets at an intersection, input the images to a machine learning program to determine a number of the targets to which a host vehicle is predicted to yield at the intersection based on time differences between the plurality of images, and transmit a message indicating the number of the targets.

20 Claims, 3 Drawing Sheets

(51) Int. Cl.
*B60W 50/00* (2006.01)
*G05B 13/02* (2006.01)
*G06T 7/00* (2017.01)
*B60W 30/09* (2012.01)

(56) References Cited

U.S. PATENT DOCUMENTS

| | | | |
|---|---|---|---|
| 10,019,011 B1 | 7/2018 | Green et al. | |
| 10,060,751 B1* | 8/2018 | Chen | G01C 21/32 |
| 10,126,135 B2 | 11/2018 | Mortazavi et al. | |
| 10,235,882 B1* | 3/2019 | Aoude | G08G 1/0137 |
| 10,832,062 B1* | 11/2020 | Evans | G06K 9/00805 |
| 10,836,309 B1* | 11/2020 | Trundle | G08G 1/0116 |
| 11,165,948 B2* | 11/2021 | Aoba | H04N 5/23222 |
| 2012/0025965 A1* | 2/2012 | Mochizuki | G08G 1/161 340/435 |
| 2012/0200490 A1* | 8/2012 | Inada | G06F 3/013 345/156 |
| 2018/0136652 A1* | 5/2018 | Jiang | G05D 1/0088 |
| 2018/0173971 A1* | 6/2018 | Jia | G06N 3/084 |
| 2019/0120946 A1* | 4/2019 | Wheeler | G01C 21/3602 |
| 2019/0161080 A1* | 5/2019 | Gochev | G08G 1/163 |
| 2019/0179327 A1* | 6/2019 | Martin | G05D 1/0231 |
| 2019/0197324 A1* | 6/2019 | Ji | G06K 9/00825 |
| 2019/0220028 A1* | 7/2019 | Anderson | G06N 3/0454 |
| 2019/0311217 A1* | 10/2019 | Tsuji | H04N 5/232122 |
| 2019/0318267 A1* | 10/2019 | Zhang | G06F 30/20 |
| 2019/0325237 A1* | 10/2019 | Zhang | G06K 9/6267 |
| 2020/0007781 A1* | 1/2020 | Aoba | H04N 5/23222 |
| 2020/0086858 A1* | 3/2020 | Yao | G06T 7/74 |
| 2020/0124719 A1* | 4/2020 | Noujeim | G01S 7/412 |
| 2020/0225669 A1* | 7/2020 | Silva | B60W 60/0015 |
| 2020/0409378 A1* | 12/2020 | Benisch | G05D 1/0221 |
| 2020/0409912 A1* | 12/2020 | Dong | G06N 20/00 |

FOREIGN PATENT DOCUMENTS

| | | | |
|---|---|---|---|
| CN | 109031943 A | * 12/2018 | |
| EP | 3324553 A1 | * 5/2018 | G08G 1/0145 |
| KR | 20180058405 A | * 6/2018 | G08G 1/16 |
| WO | WO-2017203509 A1 | * 11/2017 | G06K 9/6267 |
| WO | 2018147872 A1 | 8/2018 | |

OTHER PUBLICATIONS

Yan et al., "Intersection distance for object recognition," 2014, Publisher: IEEE.*

Yu-Kumg et al., "Intersection Image Recognition for Driving-View Images with Edge Information," 2014, Publisher: IEEE.*

* cited by examiner

VEHICLE INTERSECTION OPERATION

BACKGROUND

Vehicles can stop at an intersection to allow other vehicles to pass through the intersection. The vehicles can be instructed to stop by, e.g., a traffic light, a traffic sign, a road marking, etc. Typically, the vehicles proceed through the intersection in the order in which the vehicles arrived at the intersection.

DETAILED DESCRIPTION

Figure 1:
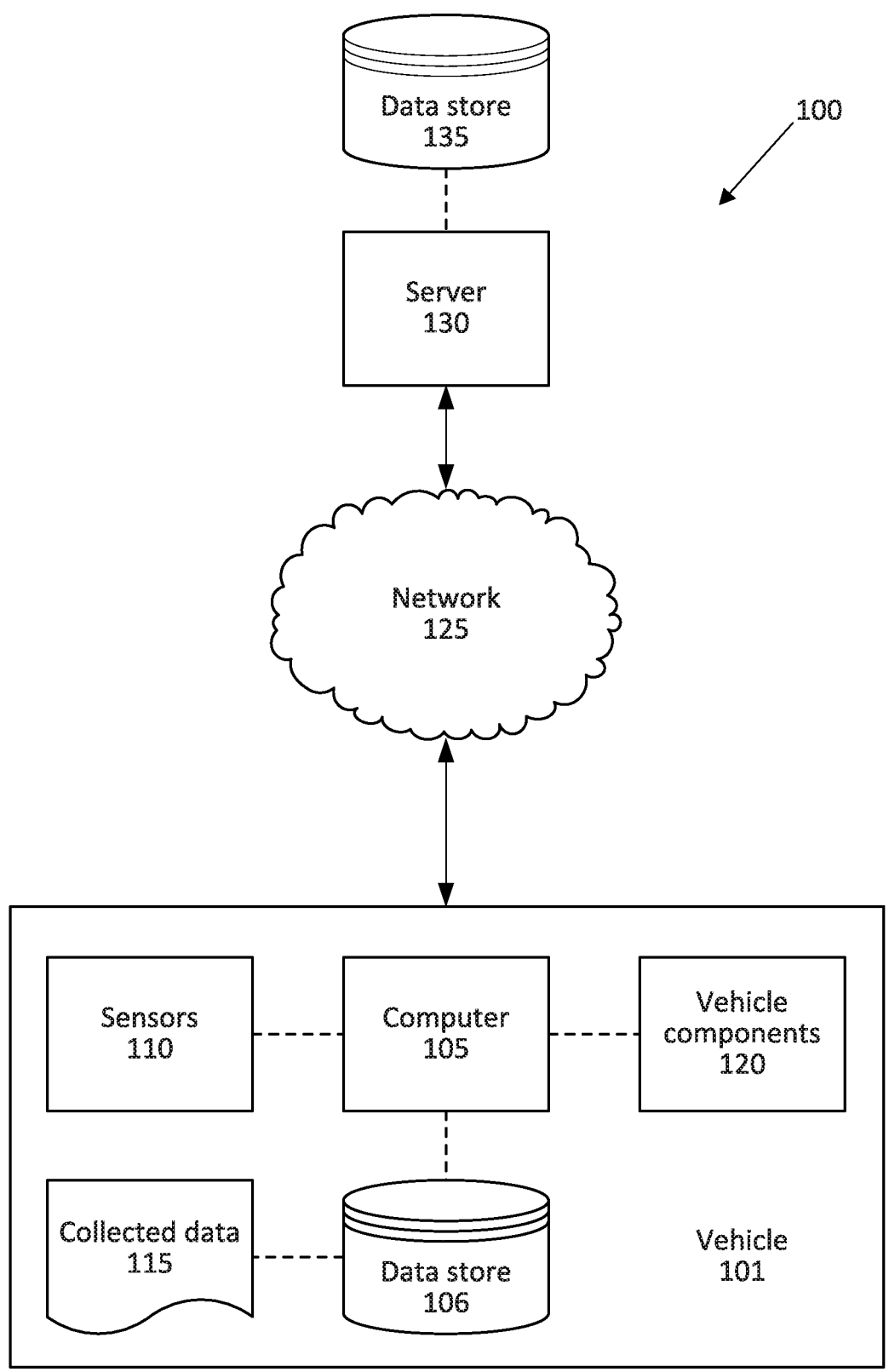
FIG. 1 is a diagram of an example system for operating a vehicle in an intersection.

A computer includes a processor and a memory, the memory storing instructions executable by the processor to collect a plurality of images of one or more targets at an intersection, input the images to a machine learning program to determine a number of the targets to which a host vehicle is predicted to yield at the intersection based on time differences between the plurality of images, and transmit a message indicating the number of the targets.

The instructions can further include instructions to actuate a brake of the host vehicle to yield to the targets at the intersection.

The instructions can further include instructions to, upon yielding to a first of the targets, transmit a message indicating a new number of the targets to which the host vehicle is predicted to yield at the intersection.

The instructions can further include instructions to apply the machine learning program to predict an order of the targets to which the host vehicle is predicted to yield at the intersection.

The instructions can further include instructions to predict the order based on respective differences of a distance between each target and a respective stopping point at the intersection.

The stopping point can be one of a traffic sign and a road marking.

The instructions can further include instructions to predict the order based on a predicted stopping time of the host vehicle at the intersection.

The instructions can further include instructions to identify the intersection as a four-way intersection and determine the number of the targets to which the host vehicle is predicted to yield as one of zero, one, two, or three targets.

The instructions can further include instructions to display the message on a windshield of the host vehicle.

The instructions can further include instructions to collect the images with a sensor mounted to the host vehicle starting at a predetermined distance from the intersection.

The instructions can further include instructions to determine that the host vehicle is at the intersection upon receiving input from an intersection infrastructure controller.

The instructions can further include instructions to determine the number of the targets to which the host vehicle is predicted to yield at the intersection based on images collected by the intersection infrastructure controller.

The instructions can further include instructions to transmit the message to the intersection infrastructure controller.

The instructions can further include instructions to, upon sending a message indicating that there are no targets to which the host vehicle is predicted to yield at the intersection, actuate a propulsion to move the host vehicle into the intersection.

A method includes collecting a plurality of images of one or more targets at an intersection inputting the images to a machine learning program to determine a number of the targets to which a host vehicle is predicted to yield at the intersection based on time differences between the plurality of images, and transmitting a message indicating the number of the targets.

The method can further include actuating a brake of the host vehicle to yield to the targets at the intersection.

The method can further include, upon yielding to a first of the targets, transmitting a message indicating a new number of the targets to which the host vehicle is predicted to yield at the intersection.

The method can further include applying the machine learning program to predict an order of the targets to which the host vehicle is predicted to yield at the intersection.

The method can further include predicting the order based on respective differences of a distance between each target and a respective stopping point at the intersection.

The method can further include predicting the order based on a predicted stopping time of the host vehicle at the intersection.

The method can further include identifying the intersection as a four-way intersection and determining the number of the targets to which the host vehicle is predicted to yield as one of zero, one, two, or three targets.

The method can further include displaying the message on a windshield of the host vehicle.

The method can further include collecting the images with a sensor mounted to the host vehicle starting at a predetermined distance from the intersection.

The method can further include determining that the host vehicle is at the intersection upon receiving input from an intersection infrastructure controller.

The method can further include determining the number of the targets to which the host vehicle is predicted to yield at the intersection based on images collected by the intersection infrastructure controller.

The method can further include transmitting the message to the intersection infrastructure controller.

The method can further include, upon sending a message indicating that there are no targets to which the host vehicle is predicted to yield at the intersection, actuating a propulsion to move the host vehicle into the intersection.

A system includes a brake of a host vehicle, means for collecting a plurality of images of one or more targets at an intersection, means for inputting the images to a machine learning program to determine a number of the targets to which the host vehicle is predicted to yield at the intersection based on time differences between the plurality of images, and means for transmitting a message indicating the number of the targets.

The system can further include means for transmitting a message indicating a new number of the targets to which the host vehicle is predicted to yield at the intersection upon yielding to a first of the targets.

The system can further include means for predicting an order of the targets to which the host vehicle is predicted to yield at the intersection.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

A host vehicle can predict a number of targets to which to yield at an intersection and transmit a message indicating the number of targets. By transmitting the message to the targets and nearby pedestrians, the host vehicle can indicate the order in which the host vehicle and the target vehicles should proceed through the intersection, avoiding or mitigating a potential collision when two vehicles try to proceed at the same time. The message can indicate which vehicle has the right of way in the intersection. Using a neural network with temporal data to determine the number of targets to which the host vehicle is predicted to yield provides a message including an alphanumeric component indicating the number of targets. The message thus provides information that both pedestrians, human operators of other vehicles, and vehicle computers can readily understand. The neural network can provide an end-to-end solution to identify the target vehicles without additional processing or modules.

FIG. 1 illustrates an example system 100 for operating a host vehicle 101 in an intersection. The system 100 includes a computer 105. The computer 105, typically included in the vehicle 101, is programmed to receive collected data 115 from one or more sensors 110. For example, vehicle 101 data 115 may include a location of the vehicle 101, data about an environment around a vehicle 101, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, or the like.

When the computer 105 partially or fully operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle propulsion, braking, and steering are controlled by the computer 105. A semi-autonomous mode is one in which at least one of vehicle propulsion, braking, and steering are controlled at least partly by the computer 105 as opposed to a human operator. In a non-autonomous mode, i.e., a manual mode, the vehicle propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
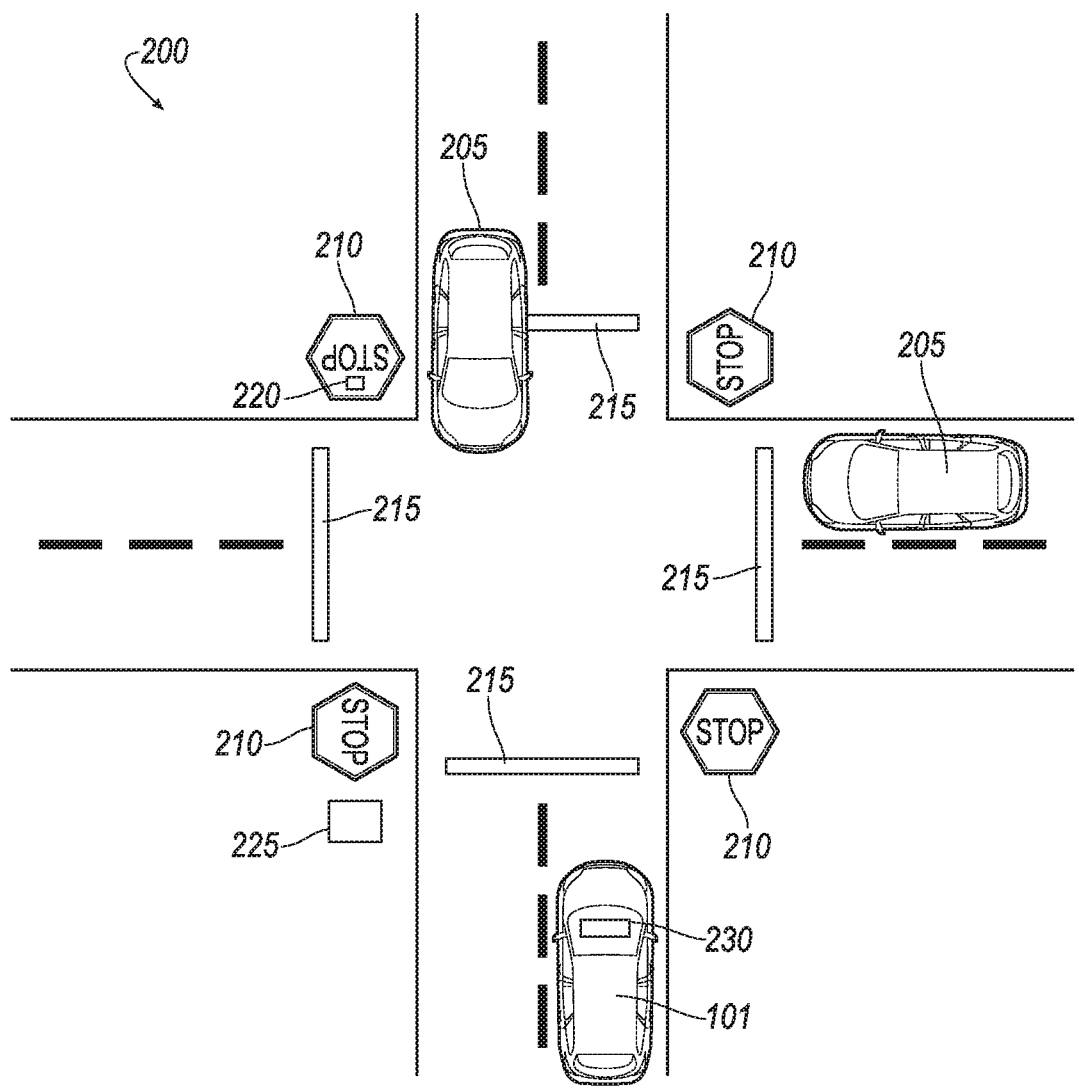
FIG. 2 is a plan view of an example intersection.

FIG. 2 is a plan view of an example intersection 200. In this context, an "intersection" is an area where two or more roadway lanes cross each other, i.e., where two or more roadway lanes intersect. The size of the area defining the intersection can be specified to encompass an area in which collisions may occur, e.g., based on a number of roadway lanes, a roadway lane size, a vehicle size, location data of prior collisions, etc. For example, the intersection can encompass 400 m² (four-hundred square meters) to account for the meeting of two adjacent roadway lanes and two transverse roadway lanes. The host vehicle 101 and a plurality of targets approach and stop at the intersection 200. In this context, a "target" is an object at the intersection 200 that has a likelihood of colliding with the host vehicle 101 to which the host vehicle 101 should yield. In the example of FIG. 2, the targets are target vehicles 205. Alternatively or additionally, the targets can include, e.g., scooters, cyclists, pedestrians, etc. The computer 105 can identify the intersection 200 based on the number of roadway lanes that meet at the intersection 200. For example, the computer 105 can identify the intersection 200 as a four-way intersection, i.e., an intersection of four roadway lanes where vehicles 101, 205 in each roadway lane stop at the intersection 200 to yield to other vehicles 101, 205. The computer 105 can determine the number of target vehicles 205 to which the host vehicle 101 is predicted to yield based on the intersection 200, e.g., at a four-way intersection, the computer 105 can determine that the host vehicle 101 should yield to one of zero, one, two, or three target vehicles 205. In the example of FIG. 2, two target vehicles 205 are at the intersection 200 ahead of the host vehicle 101.

The intersection 200 can include a plurality of traffic signs 210. The traffic signs 210 instruct the host vehicle 101 and the target vehicles 205 to stop at the intersection 200. For example, the traffic signs 210 can be stop signs, as in the example of FIG. 2, or yield signs. When the host vehicle 101 and the target vehicles 205 approach the intersection 200, the vehicles 101, 205 stop at markers 215 before proceeding into the intersection 200. That is, as each vehicle 101, 205 approaches the intersection 200, each vehicle 101, 205 stops at or near the markers 215, yielding to vehicles 101, 205 that arrived at the intersection 200 earlier. In this context, the host vehicle 101 "yields" to a target vehicle 205 by stopping at the intersection 200 until the target vehicles 205 that arrived prior to the host vehicle 101 have moved through the intersection 200. Alternatively, not shown in the Figures, the intersection 200 can include a traffic light that instructs the host vehicle 101 and the target vehicles 205 to stop at the intersection 200.

The host vehicle 101 can collect images of the target vehicles 205 at the intersection 200. The host vehicle 101 includes a sensor 110, e.g., a camera, that collects images of the target vehicles 205. The sensor 110 can be mounted to a suitable location of the host vehicle 101 to collect images of the target vehicles 205 in front of the host vehicle 101, e.g., a vehicle roof, a front hood, a windshield, etc. The host vehicle 101 can collect a plurality of images of the target vehicles 205 in substantially equal periods of time, e.g., 10 images per second. Based on the plurality of images, the computer 105 can determine the target vehicles 205 to which the host vehicle 101 must yield at the intersection 200. The host vehicle 101 can collect the images starting at a predetermined distance from the intersection 200. The predetermined distance can be stored in the data store 106 and/or received from the server 130. The predetermined distance can be determined as a distance required to collect images at the collection rate of the image sensor 110 for a machine learning program, as described below, to identify the target vehicles 205. For example, the predetermined distance can be 10 meters. Alternatively, the host vehicle can collect the images upon identifying the intersection 200, e.g., from geo-location data in a stored navigation map, a message from the server 130 and/or the intersection infrastructure controller 225 as described below, etc.

An infrastructure sensor 220 can be located at the intersection 200. The infrastructure sensor 220 collects data 115 of vehicles 101, 205 at the intersection 200 and transmits the data 115 over the network 125 to the vehicles 101, 205. For example, the infrastructure sensor 220 can be a camera mounted to, e.g., one of the traffic signs 210, a light post, a traffic light, etc. The infrastructure sensor 220 can collect images of the target vehicles 205 and transmit the images to the computer 105 over the network 125.

The intersection 200 can include an intersection infrastructure controller 225. The intersection infrastructure controller 225 communicates with the infrastructure sensor 220 and the computer 105 over the network 125. The computer 105 can receive input from the intersection infrastructure controller 225 indicating that the host vehicle 101 is approaching the intersection 200 and to yield to target vehicles 205. The intersection infrastructure controller 225 can instruct the infrastructure sensor 220 to collect images of the intersection 200. The intersection infrastructure controller 225 can transmit the images to the computer 105 and to the target vehicles 205. The computer 105 can input the images from the intersection infrastructure controller 225 to the machine learning program to determine the number of the target vehicles 205 to which the host vehicle 101 is predicted to yield at the intersection 101.

The computer 105 can input the images to a machine learning program to predict a number of target vehicles 205 to which the vehicle 101 should yield at the intersection 200. The machine learning program can be e.g., a deep neural network (DNN) with a feature-identifying layer such as a convolutional neural network (CNN) layer and a temporal layer such as a long short term memory (LSTM) layer, that receives inputs of images and provides an output of a number of target vehicles 205 to which the host vehicle 101 is predicted to yield at the intersection 200. As described below, the CNN layer identifies feature vectors in the images and the temporal layer determines time differences between feature vectors to determine an order that the target vehicles 205 will reach the intersection 200. In this context, a "feature vector" is an array of numbers identifying a characteristic of a pixel of the image, e.g., intensity, RGB values, gradient magnitude, edge of an object, etc. For example, feature vectors can identify edges of the target vehicles 205, road signs, road markings 215, traffic lights, etc. Based on the order of the target vehicles 205, the computer 105 can predict the target vehicles 205 to which the host vehicle 101 will yield at the intersection 200.

The CNN layer of the machine learning program can identify feature vectors in the images to provide to the temporal layer. To train the CNN layer, the machine learning program can receive inputs that are reference images of features of an intersection, e.g., a bumper, a windshield, a door, a side mirror, a grill, a road sign, a road marking, a traffic light, other vehicles 205, etc. Coefficients of a cost function can be adjusted so that the CNN layer outputs a correct identification of the features and locations of the features within the image upon receipt of a reference image. For example, the adjustments to the cost function of the CNN layer can be conventional gradient descent values, i.e., adjustments to the coefficients that result in changes to a gradient of the cost function to minimize the cost function. The gradients can be calculated with respect to different coefficients of the cost function to update the coefficients based on additional input data. Thus, when receiving an image, the trained CNN layer can provide output identifying feature vectors for the temporal layer.

The temporal layer of the machine learning program can determine temporal differences between the feature vectors and predict an order of the target vehicles 205 to approach the intersection 200. That is, the temporal layer receives feature vectors as inputs and maps each feature vector to one of a plurality of outputs indicating the number of target vehicles 205 to which the host vehicle 101 is predicted to yield. The temporal layer can be trained by receiving inputs of feature vectors with identified target vehicles 205 and the host vehicle 101 and an associated temporal order of the target vehicles 205 and the host vehicle 101 approaching the intersection. Coefficients of a cost function can be adjusted so the temporal layer outputs a correct identification of the order of the target vehicles 205 and the host vehicle 101 approaching the intersection 200. For example, the adjustments to the cost function of the temporal layer can be conventional gradient descent values, i.e., adjustments to the coefficients that result in changes to a gradient of the cost function to minimize the cost function.

The output can be a number indicating the number of target vehicles 205 to which the host vehicle 101 is predicted to yield at the intersection 200. That is, the output can be the number of target vehicles 205 earlier in the temporal order than the host vehicle 101. For example, if the temporal layer predicts the order of the host vehicle 101 and the target vehicles 205 such that two target vehicles 205 will reach the intersection 200 before the host vehicle 101, the temporal layer can provide an alphanumeric output of "2" or "yield for two vehicles." The computer 105 can control the host vehicle 101 to yield for the number of target vehicles 205 provided by the output of the temporal layer. Alternatively or additionally, the temporal layer can receive inputs of images from the CNN layer and output the number of target vehicles 205 to yield at the intersection 200.

The temporal layer can be trained to predict the order of the target vehicles 205 approaching the intersection 200 based on respective differences of a distance between each target vehicle 205 and a respective stopping point at the intersection 200. The stopping point can a point at which the target vehicle 205 is predicted to stop at the intersection 200, e.g., a traffic sign 210, a road marking 215, etc. The temporal layer can be trained to identify changes in the distance between each target vehicle 205 and the stopping point and the predicted time for each target vehicle 205 to stop at the stopping point, i.e., the "stopping time" of each target vehicle 205. That is, the temporal layer can predict a speed for each target vehicle 205 and a distance between each target vehicle 205 and the respective stopping point for each target vehicle 205 based on identified temporal differences between the feature vectors from training of the temporal layer and the CNN layer. Based on the predicted speed and distance, the temporal layer can predict the stopping time for each target vehicle 205. The temporal layer can output the order as the vehicles 101, 205 with increasing stopping times, i.e., the first vehicle 101, 205 has the shortest stopping time, and each successive vehicle 101, 205 in the order has the next shortest stopping time.

Upon providing an output of the number of target vehicles 205, the computer 105 can send a message indicating the number of target vehicles 205. The computer 105 can send the message over the network 125 to targets at the intersection, including target vehicles 205 to which the host vehicle 101 is not predicted to yield. That is, the computer 105 can inform all target vehicles 205 at and/or approaching the intersection 200 of the number of target vehicles 205 to which the host vehicle 101 is predicted to yield. Additionally, the computer 105 can send the message over the network 125 to mobile devices of pedestrians at the intersection 200. Additionally, the computer 105 can send the message over the network 125 to the intersection infrastructure controller 225.

The computer 105 can display the number of target vehicles 205 to which the host vehicle 101 is predicted to yield on a display screen 230 of the host vehicle 101. The display screen 230 can provide the message to pedestrians watching the host vehicle 101. The display screen 230 can be, e.g., a liquid-crystal display (LCD), a light-emitting diode (LED) display, etc. The display screen 230 can be disposed on a front windshield of the host vehicle 101. The display screen 230 can display the message as a number indicating the number of target vehicles 205 to which the host vehicle 101 will yield. Alternatively or additionally, the host vehicle 101 can include a projector or the like that projects the message onto the front windshield, e.g., in what is known as a heads-up display.

The computer 105 can actuate a brake 120 of the host vehicle 101 to yield to the target vehicles 205 at the intersection 200. Because the host vehicle 101 arrives at the intersection 200 after the target vehicles 205, the host vehicle 101 yields to the target vehicles 205 at the intersection 200. When one of the target vehicles 205 passes through the intersection 200, the computer 105 can collect additional images and predict a new number of target vehicles 205 to which to yield. The computer 105 can transmit a message indicating the new number of target vehicles 205 to which to yield at the intersection 200. That is, if the computer 105 had previously determined to yield to two target vehicles 205, and one of the target vehicles 205 passes through the intersection 200, the computer 105 can identify the remaining target vehicle 205 and determine that the host vehicle 101 should yield to one target vehicle 205. The computer 105 can transmit a message indicating that the host vehicle 101 will yield to one target vehicle 205 over the network 125, as described above.

When the computer 105 determines that the number of target vehicles 205 to which the host vehicle 101 should yield is zero, the computer 105 can actuate a propulsion 120 to move the host vehicle 101 through the intersection 200. That is, when all target vehicles 205 to which the host vehicle 101 should yield have passed through the intersection 200, the remaining target vehicles 205 can yield to the host vehicle 101 as the host vehicle 101 passes through the intersection 200. The computer 105 can transmit a message indicating that there are no target vehicles 205 to which the host vehicle 101 is predicted to yield at the intersection 200 prior to actuating the propulsion 120.

Figure 3:
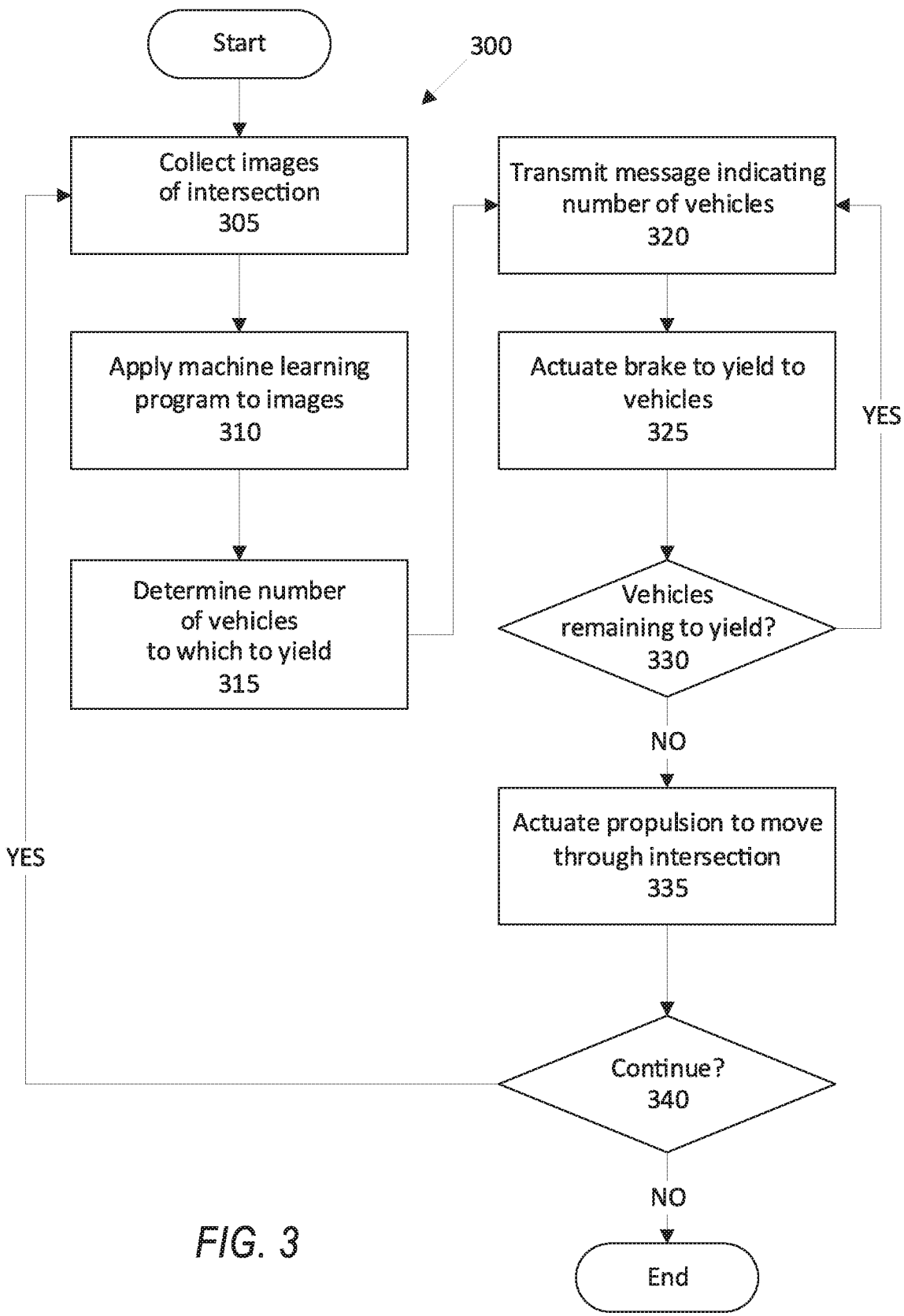
FIG. 3 is an example process for operating the vehicle in the intersection.

FIG. 3 is a diagram of an example process 300 for operating a host vehicle 101 in an intersection 200. The process 300 begins in a block 305, in which a vehicle 101 image sensor 110 and/or an infrastructure sensor 220 collects images of the intersection 200. The images can include data 115 indicating the host vehicle 101 and/or one or more target vehicles 205. When the infrastructure sensor 220 collects the images of the intersection 200, an infrastructure controller 225 and/or a server 130 can transmit the images to the computer 105 over a network 125.

Next, in a block 310, the computer 105 inputs the images to a machine learning program. As described above, the machine learning program can be a deep neural network with a convolutional neural network layer that identifies target vehicles 205 in the images and a temporal layer that identifies temporal differences between features of the images, e.g., features of the target vehicles 205, road signs, road markings 215, traffic lights, etc. The machine learning program can be trained to recognize an order at which the host vehicle 101 and the target vehicles 205 will arrive at the intersection 200 with the temporal layer.

Next, in a block 315, the computer 105 determines a number of target vehicles 205 to which the host vehicle 101 is predicted to yield at the intersection 200. Based on the order identified by the temporal layer, the machine learning program can output a number of target vehicles 205 that are predicted to arrive at the intersection 200 before the host vehicle 101. Because the host vehicle 101 yields to target vehicles 205 that arrive at the intersection 200 before the host vehicle 101, the computer 105 can determine a number of target vehicles 205 that the machine learning program predicts will arrive at the intersection 200 before the host vehicle 101 is the number of target vehicles 205 to which the host vehicle 101 is predicted to yield at the intersection 200.

Next, in a block 320, the computer 105 transmits a message indicating the number of target vehicles 205 to which the host vehicle 101 is predicted to yield. The message can be a single numerical character indicating the number of target vehicles 205 or can be an alphanumeric string of text stating that the host vehicle 101 will yield to the target vehicles 205, e.g., "yielding for 2 vehicles." The computer 105 can send the message over the network 125 to the target vehicles 205 and/or the server 130 and/or user devices of pedestrians at the intersection 200. Additionally, the computer 105 can display the message on a display 230 on the host vehicle 101, e.g., on a windshield of the host vehicle 101, to display the message to pedestrians and target vehicles 205 at the intersection 200.

Next, in a block 325, the computer 105 actuates a brake 120 to yield to the target vehicles 205 at the intersection 200. The computer 105 can move to a road marking 215 and actuate the brake 120 to stop the vehicle 101 at the road marking 215 as one of the target vehicles 205 passes through the intersection 200.

Next, in a block 330, the computer 105 determines whether there are any remaining target vehicles 205 to which the host vehicle 101 is predicted to yield. The computer 105 can input new images of the intersection 200 to the machine learning program and receive an output of the current number of target vehicles 205 to which the host vehicle 101 is predicted to yield at the intersection. If the output is zero, the computer 105 can determine that the host vehicle 101 should yield to no more target vehicles 205, and the process 300 continues in a block 335. Otherwise, if the output is nonzero, the computer 105 can determine that the host vehicle 101 should yield to at least one more target vehicle 205 and the process 300 returns to the block 320 to transmit a message with the new number of target vehicles 205 to which the host vehicle 101 is predicted to yield at the intersection 200.

In the block 335, the computer 105 actuates a propulsion 120 to move the host vehicle 101 through the intersection 200. Because the host vehicle 101 no longer has to yield to target vehicles 205, the host vehicle 101 can proceed through the intersection 200. The computer 105 can actuate a steering component 120 to steer the vehicle 101 to a different roadway lane.

Next, in a block 340, the computer 105 determines whether to continue the process 300. For example, the computer 105 can determine to continue the process 300 if the host vehicle 101 is approaching another intersection 200. In another example, the computer 105 can determine not to continue the process 300 when the host vehicle 101 has stopped and powered off. If the computer 105 determines to continue, the process 300 returns to a block 305 to collect more images. Otherwise, the process 300 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130 include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Python, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 300, one or more of the steps could be omitted, or the steps could be executed in a different order than shown in FIG. 3. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   collect a plurality of images of one or more targets at an intersection;
   input the images to a machine learning program to determine an alphanumeric component indicating a number of the targets to which a host vehicle is predicted to yield at the intersection based on time differences between the plurality of images;
   transmit, to a remote computer, a message including the alphanumeric component indicating the number of the targets; and
   actuate a component of the host vehicle based on the alphanumeric component.

2. The system of claim 1, wherein the instructions further include instructions to actuate a brake of the host vehicle to yield to the targets at the intersection.

3. The system of claim 1, wherein the instructions further include instructions to, upon yielding to a first of the targets, transmit a message indicating a new number of the targets to which the host vehicle is predicted to yield at the intersection.

4. The system of claim 1, wherein the instructions further include instructions to apply the machine learning program to predict an order of the targets to which the host vehicle is predicted to yield at the intersection.

5. The system of claim 4, wherein the instructions further include instructions to predict the order based on respective differences of a distance between each target and a respective stopping point at the intersection.

6. The system of claim 5, wherein the stopping point is one of a traffic sign and a road marking.

7. The system of claim 4, wherein the instructions further include instructions to predict the order based on a predicted stopping time of the host vehicle at the intersection.

8. The system of claim 1, wherein the instructions further include instructions to identify the intersection as a four-way intersection and determine the number of the targets to which the host vehicle is predicted to yield as one of zero, one, two, or three targets.

9. The system of claim 1, wherein the instructions further include instructions to display the message on a windshield of the host vehicle.

10. The system of claim 1, wherein the instructions further include instructions to collect the images with a sensor mounted to the host vehicle starting at a predetermined distance from the intersection.

11. The system of claim 1, wherein the instructions further include instructions to determine that the host vehicle is at the intersection upon receiving input from an intersection infrastructure controller.

12. The system of claim 11, wherein the instructions further include instructions to determine the number of the targets to which the host vehicle is predicted to yield at the intersection based on images collected by the intersection infrastructure controller.

13. The system of claim 11, wherein the instructions further include instructions to transmit the message to the intersection infrastructure controller.

14. The system of claim 1, wherein the instructions further include instructions to, upon sending a message indicating that there are no targets to which the host vehicle is predicted to yield at the intersection, actuate a propulsion to move the host vehicle into the intersection.

15. A method, comprising:
   collecting a plurality of images of one or more targets at an intersection;
   inputting the images to a machine learning program to determine an alphanumeric component indicating a number of the targets to which a host vehicle is predicted to yield at the intersection based on time differences between the plurality of images;
   transmitting, to a remote computer, a message including the alphanumeric component indicating the number of the targets; and
   actuating a component of the host vehicle based on the alphanumeric component.

16. The method of claim 15, further comprising, upon yielding to a first of the targets, transmitting a message indicating a new number of the targets to which the host vehicle is predicted to yield at the intersection.

17. The method of claim 15, further comprising applying the machine learning program to predict an order of the targets to which the host vehicle is predicted to yield at the intersection.

18. A system, comprising:
   a brake of a host vehicle;
   means for collecting a plurality of images of one or more targets at an intersection;
   means for inputting the images to a machine learning program to determine an alphanumeric component indicating a number of the targets to which the host vehicle is predicted to yield at the intersection based on time differences between the plurality of images;
   means for transmitting, to a remote computer, a message including the alphanumeric component indicating the number of the targets; and
   means for actuating a component of the host vehicle based on the alphanumeric component.

19. The system of claim 18, further comprising means for transmitting a message indicating a new number of the targets to which the host vehicle is predicted to yield at the intersection upon yielding to a first of the targets.

20. The system of claim 18, further comprising means for predicting an order of the targets to which the host vehicle is predicted to yield at the intersection.

* * * * *